Dec. 8, 1953 H. W. MILLER ET AL 2,661,901
COUNTER TO INDICATE THE NUMBER OF TIMES A SHAFT IS MOVED
Filed July 25, 1951 2 Sheets-Sheet 1

INVENTORS
H. WOOD MILLER
B. ALVIN BUSS
BY
Bruno C. Lechler

Dec. 8, 1953     H. W. MILLER ET AL     2,661,901
COUNTER TO INDICATE THE NUMBER OF TIMES A SHAFT IS MOVED
Filed July 25, 1951     2 Sheets-Sheet 2
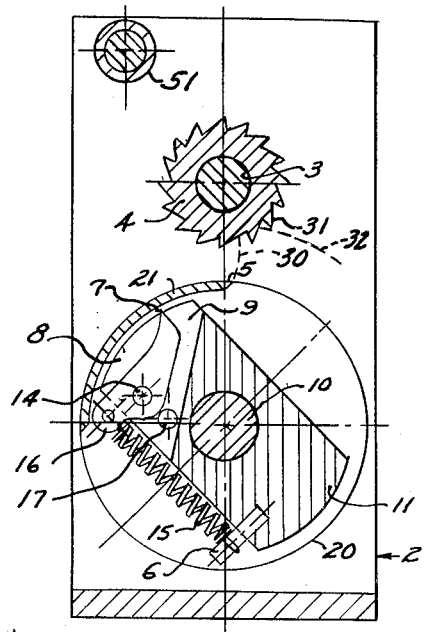
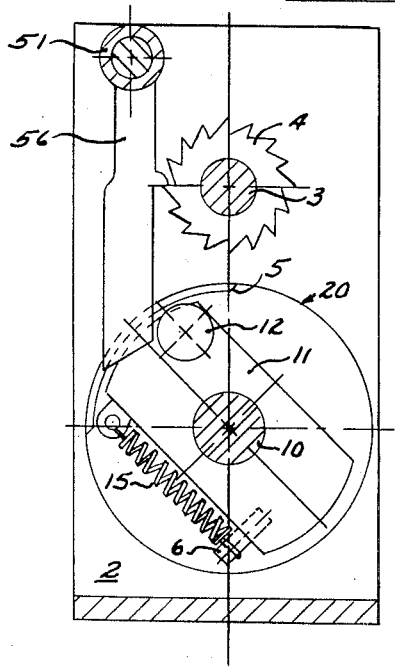
INVENTORS
H. WOOD MILLER
B. ALVIN BUSS
BY
Bruno C. Fichler Patented Dec. 8, 1953

2,661,901

UNITED STATES PATENT OFFICE 2,661,901

COUNTER TO INDICATE THE NUMBER OF TIMES A SHAFT IS MOVED

Hercheal Wood Miller, Davenport, Iowa, and Benjamin Alvin Buss, East Moline, Ill., assignors to American Machine and Metals, Inc., New York, N. Y., a corporation of Delaware Application July 25, 1951, Serial No. 238,526

2 Claims. (Cl. 235—91)

The invention relates to a device which, when used in connection with a controller having a number of steps indicated on a scale, permits the operator to move the shaft from its initial position to any of the steps and which will indicate the number of times that the operator has thus moved the shaft past a given point on the scale in a forward direction. Thus, the operator can move the indicator on the shaft to a step short of the given point and return it to or toward the starting point without affecting the indicator. If the operator moves past the given point on the scale, the movement will be registered by moving the indicator forward one number. This registration of one number will result regardless of whether the indicator on the shaft is moved just one step past the given point or several steps. This invention is shown in abandoned application 719,652 filed January 2, 1947.

The invention is particularly well adapted for use with an electric controller of the familiar type in which a knob at the end of the shaft turns the shaft through a number of steps, the position of the knob indicating the step to which the shaft is turned at the moment. At each of these steps the controller may control a certain group of operations in a machine or a process. The first few steps may control preliminary operations, such as starting a motor or a heater. After passing the preliminary steps, the shaft reaches steps which control some actual operation on material. Thus, if the controller is operating a washing machine, the initial steps may start the motor, close a dump valve, admit water or detergent to the washer, and in any other manner prepare for the operation to follow. All of the steps beyond the given point may then control the performance of actual operations on material being processed. In the case of the washer, these steps may control the agitation of the goods either in a detergent bath or the agitation in rinse water.

Generally the count desired is not the number of times that the operator has turned the knob forward or backward, but the number of useful operations that have been performed on the material to be processed. Thus, in the case of the washer, the operator might move to a preliminary step starting the motor or filling the washer with water and might then return to the starting point stopping the motor and dumping the water. The count desired would not be that of such testing operations but only those shaft movements which continue to a step beyond the given point where some actual operation on the goods is carried through.

In counters as hitherto constructed, the shaft carries a pawl and a ratchet wheel is mounted on a spindle near the shaft so that as the pawl on the shaft is carried past the ratchet, the ratchet disc is moved forward. This ratchet disc is generally biased by a spring or the like to turn in a direction opposite the movement of the pawl. A second pawl carried by the frame engaging the same ratchet, prevents the biasing means from turning the disc back until both pawls are simultaneously drawn out of contact with the ratchet disc. In order to secure positive movement of the ratchet disc by the pawl it is desirable to give the teeth of the ratchet disc considerable depth. To prevent the pawl on the shaft from moving the ratchet disc to increase the count by more than one unit at a time, it is customary to so place the pawl in relation to the shaft and the ratchet disc that the ratchet disc is moved either as the shaft begins its movement through a fixed arc or as it completes its movement through that fixed arc.

In the present instance such counting devices are not applicable because it is not intended to take account of each rotation of the shaft at the beginning of that rotation. It is only desired to count the number of rotations of the shaft in which the indicator has passed a given point.

Likewise it is not possible to place the pawl so that the ratchet disc is moved only when the shaft has completed its swing through a given arc, because the total swing of the shaft depends upon the step selected by the operator.

The invention provides a pawl on a carrier attached to the shaft. The pawl is biased to project outward but its point is restrained from outward movement by a stationary arcuate barrier concentric with the shaft until the shaft indicator has moved to the given point on the scale. When the shaft has moved through the angle past the given point, the pawl is free to move out radially to the limit of its motion. The ratchet disc is so placed relative to this arcuate barrier and the center of the shaft and the carrier that after the pawl engages the ratchet disc, movement to the next step on the scale will turn the ratchet disc one step and also carry the pawl away from the ratchet disc. Thus, if the operator moves additional steps, the counting device will not be effected thereby. When the shaft and the carrier turn backwards, the spring holding the pawl in its outward position allows it to be pushed back by the stationary teeth of the ratchet mechanism.

In counters of this type which indicate the number of consecutive operations, it is desired to periodically return the counter to its zero position. One of the novel features of the invention is that when the operator turns the shaft backward toward the starting point from a step selected, he need only go back one step beyond the starting point to clear the counter and let the biasing spring bring the counter back against a zero stop.

One object of the invention is to provide a registering device which will count the number of forward movements of the shaft beyond a specified unregistering range without regard to the extent of movement of the shaft beyond that range.

Another object of the invention is to provide a device which will register the number of forward movements of the shaft from an initial position without regard to the extent of these movements past a given point and which will be affected by the retrograde movement of the shaft only if carried past the initial position.

Another object of the invention is to provide a stepping device having a pawl carried by a rotating shaft cooperating with an arcuate barrier and a ratchet disc on a spindle in such a manner that during a predetermined initial range of forward movement no engagement between the pawl and the ratchet disc takes place, while upon movement beyond this range the pawl engages the ratchet disc and moves this disc forward a fixed amount.

Another object of the invention is to provide a stepping device having a pawl carried by a rotating shaft cooperating with an arcuate barrier and a ratchet disc on a spindle in such manner that during a predetermined initial range of forward movement no engagement between the pawl and the ratchet disc takes place, while upon movement beyond this range the pawl engages the ratchet disc and moves this disc forward a fixed amount regardless of this further travel of the pawl.

Other and further objects of this invention will become apparent from the disclosures in the specification and the accompanying drawings.

In order to better understand the invention, reference is made to the drawings.

Fig. 3 is a cross section taken along line 3—3 in Fig. 2.

Fig. 4 is a cross section taken along line 4—4 in Fig. 2.

Figure 1:
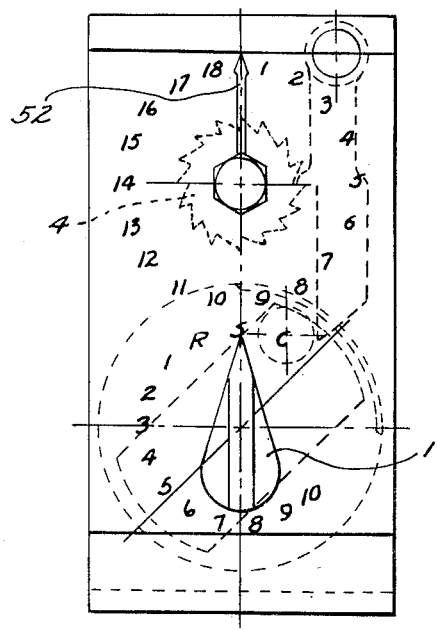
Fig. 1 is a front elevation of the device.
Figure 2:
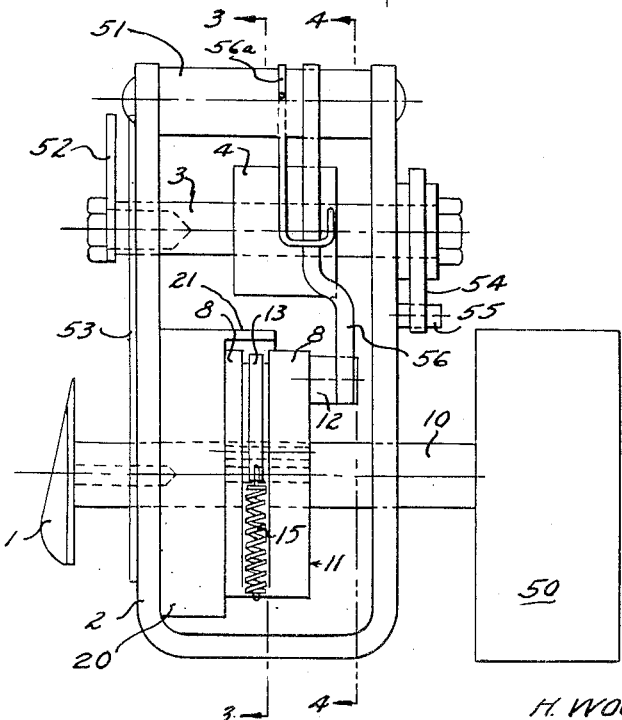
Fig. 2 is a side elevation of the device.

In these drawings, 10 indicates the shaft of a controller contained in box 50. Handle 1 at the end of this shaft will move the controller forward step by step and the handle will indicate the step on a scale on the outside of the device. The shaft and the other parts may be supported on a U-shaped frame 2. The shaft 10 has mounted thereon a pawl carrier 11. This carrier may consist of a bar into one end of which a slot 9 has been milled leaving two ears 8 along-side of the slot. A pin 14 passes through the two ears and acts as a pivot which supports a stepping pawl 13. The pawl 13 has an end 7 and a rearward extension 16. A spring 15 is attached at one end to the extension 16 and at the other end to a pin 6. This pin 6 also is supported on carrier 11. To limit the outward motion of the end 7 of the pawl under the affect of spring 15, a stop pin 17 is also supported by the two ears 8. When the end 16 of the pawl bears against the stop 17, 7 will have moved out to the arc 32 shown in Fig. 3. A stationary piece 20 is attached to the frame 2 and carries an arcuate barrier 21 along a portion of its circumference. This barrier limits the outward movement of the end 7 of the pawl when the apparatus is in its initial position as shown in Fig. 3. Before the stepping pawl 13 can move outward to contact the ratchet wheel 4, handle 1 in Fig. 1 must be turned to the left a distance sufficient to carry the end of the pawl 7 past the end 5 of the barrier 21. The frame 2 supports the spindle 3. This spindle carries the ratchet disc 4. This spindle is connected to one end of coil spring 54, the other end of which is anchored to the frame at 55. This coil spring is wound up whenever the ratchet disc 4 is stepped forward and tends to return the ratchet disc to its initial position when a restraining mechanism is released. This restraining mechanism consists of a holding pawl 56 pivoted on a pin 51 which extends through the two legs of the U-shaped frame 2. The pawl 56 may be held in engagement with the ratchet disc by its own weight. If preferred, the spring 56a anchored on pin 51 may urge the pawl into engagement with the ratchet disc. Carrier 11 carries a boss 12 which projects out sideways as shown in Fig. 2 into the path of the holding pawl 4. The shaft 3 also carries a pointer 52 at its forward end. This pointer indicates on a disc 53, which is attached to the face of the U piece 2, the number of the operation which is in progress. These equally spaced positions of the pointer have been indicated numerically in Fig. 1. One of the advantages of the construction described is that it permits the use of deeply cut teeth on the ratchet disc 4 and the pawl 13 is moved radially into the space between two teeth along the path shown in the dotted lines at 30 in Fig. 3 without moving the ratchet. However a small further movement of the shaft causes the pawl whose point is moving along the line 32 in Fig. 3 to positively turn the ratchet disc and pass away from the ratchet disc. The operation is as follows:

Fig. 1 shows the knob 1 pointing to the symbol S which indicates that the apparatus is stopped and is in its start or initial position. Fig. 3 shows the end of the pawl bearing against the inner surface of the barrier 21. The operator may now move the knob 1 to R turning the controller correspondingly. R may correspond to such a position of the controller as would start the motor or any other preliminary step. As yet, the step indicator 52 has not been moved. The operator may now return the knob 1 to the initial position S without any indication being made by the pointer 52 that the shaft has been moved. When the operator moves the knob 1 beyond the fixed point which may be 1 on the scale, the end 7 of the pawl will have reached the end of the barrier 5 and move radially out along the line 30 into position in contact with the ratchet 4. Only a small amount of movement of the shaft is necessary, in going from point 1 to 2, for the ratchet to turn the disc and to leave the disc thereafter along the path 32.

When the operator returns the pointer 1 to the initial position S the record of the ratchet wheel as shown by the arm 52 on the scale will not be cleared. However, if the knob 1 is carried further, the boss 12 will engage the lower end of the pawl 56 and allow the spring to return the pointer 52 to its starting position.

It is clear that regardless of whether the handle 1 is moved to position 4 or to position 7 there will be no further movement of the ratchet disc 4. Accordingly the pointer 52 will have moved to point 1 and remains there. When the particular operation which is indicated by the position selected for the knob 1 has been completed the operator will return the knob to position 1 or position R in order to rearrange his machine preparatory to the next step. The operator is now prepared to again turn the handle 1 counter-clockwise in Fig. 1 to the numbered position which provides for the particular operation he wishes to perform next. A glance at pointer 52 will indicate what steps in a given formula he has already completed.

The operator does not normally come back to the starting position S but he may do so if he so desires. When all of the operations have been performed the operator turns the handle 1 in the reverse direction to the position C. This position may prepare the machine for unloading and in turning to position C the boss 12 has been brought into contact with the holding pawl 56 moving it out of engagement with the ratchet disc 4. This allows the spring 54 to carry the shaft 3 back to its initial position.

We claim:

1. A counter adapted to register the number of times a shaft is turned from its initial position beyond a preset angle having, in combination, a spindle assembly including a ratchet disc and pointer, means biasing said spindle assembly to turn in one direction, means engaging the teeth of said disc to hold said spindle assembly in any position to which it has been advanced against said biasing means, a shaft parallel to said spindle assembly, a pawl-carrier attached to said shaft, a pawl pivoted on the carrier, a spring on the carrier pushing the pawl outward toward said ratchet disc, and a stationary barrier restraining the outward movement of the tip of said pawl until said shaft assembly has been turned beyond a preset angle, whereupon the path of said pawl tip intersects the circular path of the teeth of said ratchet disc over a distance sufficient to move said spindle assembly each time said shaft is turned beyond a preset angle through a unit arc that is unaffected by any additional angle through which said shaft is turned.

2. A counter adapted to register the number of times a shaft is turned from its initial position beyond a preset angle having, in combination, a spindle assembly including a ratchet device and pointer, a first biasing means biasing said spindle assembly to turn in one direction, means engaging the teeth of said ratchet device to hold said spindle assembly in any position to which it has been advanced against said biasing means, a shaft mounted in spaced relationship to said spindle assembly, a pawl-carrier attached to said shaft, a pawl pivoted on the carrier, a second biasing means on the carrier biasing the pawl toward said ratchet device, and a barrier restraining the movement of the tip of said pawl until said shaft assembly has been turned beyond a preset angle, whereupon the path of said pawl tip intersects the path of the teeth of said ratchet device over a distance sufficient to move said spindle assembly each time said shaft is turned beyond a preset angle through a unit arc that is unaffected by any additional angle through which said shaft is turned.

H. WOOD MILLER.
B. ALVIN BUSS.

References Cited in the file of this patent

UNITED STATES PATENTS

| Number | Name | Date |
| --- | --- | --- |
| 485,869 | Holding | Nov. 8, 1892 |
| 872,188 | Mascart | Nov. 26, 1907 |
| 1,123,948 | Strasser | Jan. 5, 1915 |
| 1,465,258 | French | Aug. 21, 1923 |

FOREIGN PATENTS

| Number | Country | Date |
| --- | --- | --- |
| 381,230 | Great Britain | Oct. 3, 1932 |